(12) United States Patent
Takahashi (10) Patent No.: US 12,145,439 B2
(45) Date of Patent: Nov. 19, 2024

(54) CLUTCH PEDAL LOCKING DEVICE (71) Applicant: KUBOTA CORPORATION, Osaka (JP)

(72) Inventor: Naoko Takahashi, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/279,231

(22) PCT Filed: Mar. 9, 2022

(86) PCT No.: PCT/JP2022/010419
§ 371 (c)(1),
(2) Date: Aug. 29, 2023

(87) PCT Pub. No.: WO2022/202344
PCT Pub. Date: Sep. 29, 2022

(65) Prior Publication Data
US 2024/0116360 A1    Apr. 11, 2024

(30) Foreign Application Priority Data

Mar. 22, 2021  (JP) ................................. 2021-047165

(51) Int. Cl.
*B60K 23/02*  (2006.01)
*B60R 25/00*  (2013.01)
*F16B 21/12*  (2006.01)

(52) U.S. Cl.
CPC ............ *B60K 23/02* (2013.01); *B60R 25/005* (2013.01); *F16B 21/12* (2013.01)

(58) Field of Classification Search
CPC ....... B60K 23/02; B60R 25/005; F16B 21/12; F16B 21/09; F16D 23/12
See application file for complete search history.

(56) References Cited

U.S. PATENT DOCUMENTS

| | | | |
|---|---|---|---|
| 3,469,666 A * | 9/1969 | Goode | F16D 23/12 |
| | | | 192/30 W |
| 5,511,631 A * | 4/1996 | Tsuchihashi | G05G 1/30 |
| | | | 192/114 R |

(Continued)

FOREIGN PATENT DOCUMENTS

| | | |
|---|---|---|
| JP | 55-030734 Y2 | 7/1980 |
| JP | 58-187825 U | 12/1983 |

(Continued)

OTHER PUBLICATIONS

English abstract of JP S60252047 A, Kodo, Dec. 12, 1985 (Year: 1985).*

(Continued)

*Primary Examiner* — Vinh Luong
(74) *Attorney, Agent, or Firm* — Keating & Bennett, LLP (57) ABSTRACT

A clutch pedal locking device includes a clutch pedal, a stay attached to the clutch pedal, a plate attached to a lower surface of the stay and extending backward from the stay, a fixed portion provided to a lateral side of the clutch pedal and fixed to a work vehicle body, and a rotation plate suspended from and supported on the fixed portion so as to be rotatable about a rotation shaft. In a case where the rotation plate rotates until a longitudinal direction becomes substantially horizontal, the rotation plate comes into contact with an upper surface of the plate and a back surface of the stay, and the clutch pedal is locked in a state of being stepped on.

5 Claims, 9 Drawing Sheets

(56) References Cited

U.S. PATENT DOCUMENTS

| | | | |
|---|---|---|---|
| 5,555,774 A | 9/1996 | Lauring et al. | |
| 2024/0140371 A1* | 5/2024 | Takahashi | B60T 7/04 |

FOREIGN PATENT DOCUMENTS

| | | | | |
|---|---|---|---|---|
| JP | S60252047 A | * | 12/1985 | B60T 7/04 |
| JP | 63-130329 U | | 8/1988 | |
| JP | 05-032836 U | | 4/1993 | |
| JP | 2569803 Y2 | | 4/1998 | |
| JP | 7189991 B2 | | 12/2022 | |

OTHER PUBLICATIONS

Official Communication issued in International Patent Application No. PCT/JP2022/010419, mailed on May 24, 2022.

* cited by examiner

CLUTCH PEDAL LOCKING DEVICE

CROSS REFERENCE TO RELATED APPLICATIONS

This is a U. S. National Phase Application under 35 U.S.C. § 371 of International Patent Application No. PCT/JP2022/010419, filed on Mar. 9, 2022, which claims priority of Japanese Patent Application No. 2021-047165, filed on Mar. 22, 2021. The entire contents of each application are hereby incorporated by reference.

BACKGROUND OF THE INVENTION

1. Field of the Invention

The present invention relates to a clutch pedal locking device.

2. Description of the Related Art

Conventionally, in a work vehicle such as a tractor, a clutch pedal locking device that enables a clutch pedal to be locked in a state of being stepped on is known (see, for example, Utility Model Registration No. 2569803).

SUMMARY OF THE INVENTION

However, the clutch pedal locking device disclosed in Utility Model Registration No. 2569803 is attached to the front side of the clutch pedal which is in a state of being stepped on, and there is a problem that it is difficult to apply the clutch pedal locking device to a work vehicle in which a component for attaching the clutch pedal locking device to the engine room side, such as a dash panel or a mount member, does not exist.

Preferred embodiments of the present invention provide clutch pedal locking devices each having a simple structure that is realized at low cost.

A clutch pedal locking device according to a preferred embodiment includes a clutch pedal, a stay attached to the clutch pedal, a first plate attached to a lower surface of the stay and that extends backward from the stay, a first fixed portion provided to a lateral side of the clutch pedal and fixed to a work vehicle body, and a rotation plate suspended from and supported on the first fixed portion so as to be rotatable about a rotation shaft, wherein in a case where the rotation plate rotates until a longitudinal direction becomes substantially horizontal, the rotation plate comes into contact with an upper surface of the first plate and a back surface of the stay, and the clutch pedal is locked in a state of being stepped on.

According to preferred embodiments of the present invention, it is possible to provide clutch pedal locking devices each having a simple structure that is realized at low cost.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail with reference to the accompanying drawings. In the following drawings, the same or similar reference numerals denote the same or similar portions. However, it should be noted that the drawings are schematic, and the proportions of each dimension are different from the actual figures. Therefore, specific dimensions should be determined in consideration of the following explanation. Further, the drawings may include portions having different dimensional relationships and ratios between the drawings. In the present specification and drawings, elements having substantially the same functions and structures are denoted by the same reference numerals, and redundant description thereof is omitted, and elements not directly related to preferred embodiments of the present invention are omitted from the drawings.

First Preferred Embodiment

Hereinafter, a combination clutch pedal locking device 100 according to a first preferred embodiment of the present invention will be described with reference to FIGS. 1 to 7.

Figure 1:
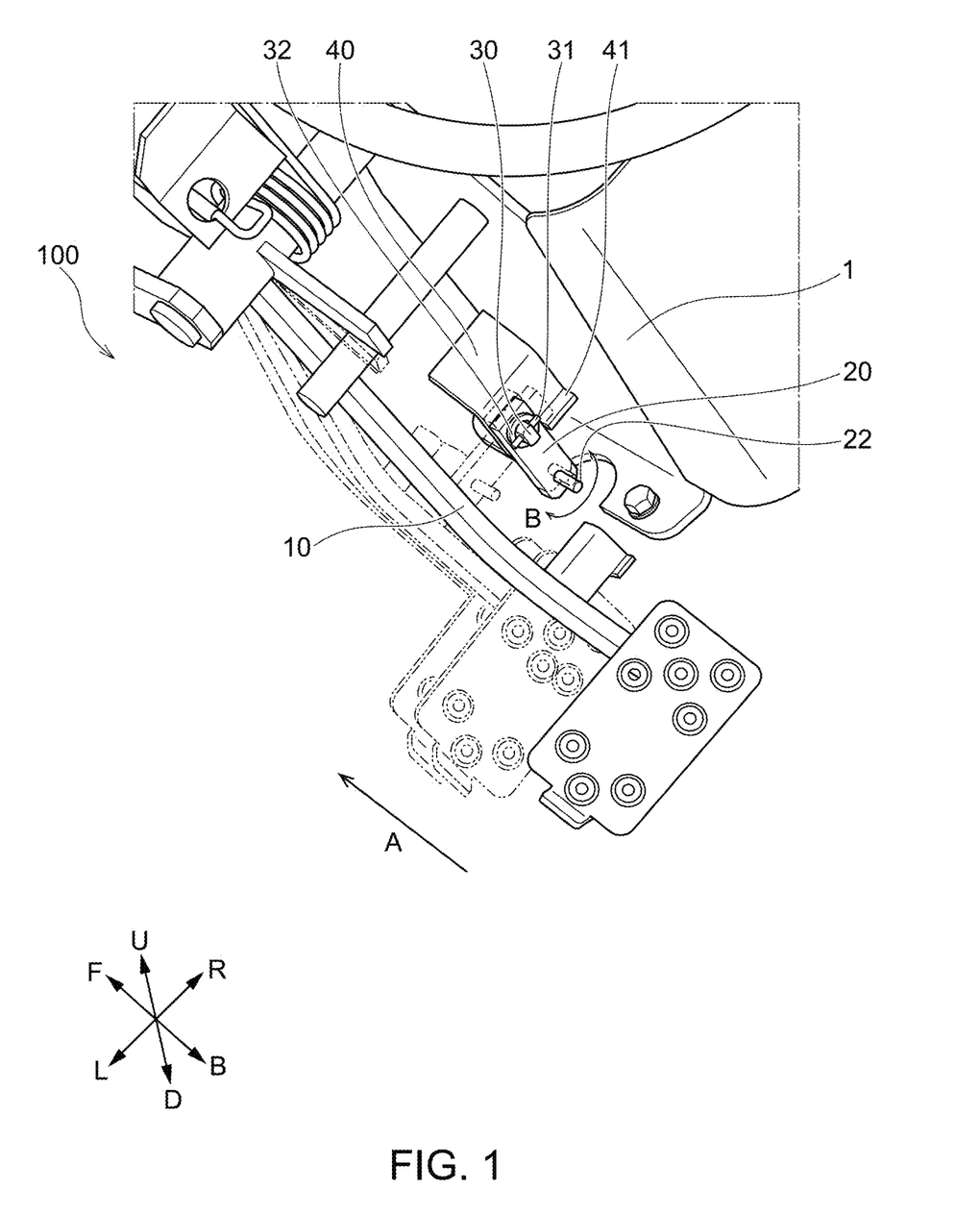
FIG. 1 is a perspective view of an example of a clutch pedal locking device 100 according to a preferred embodiment of the present invention.
Figure 2:
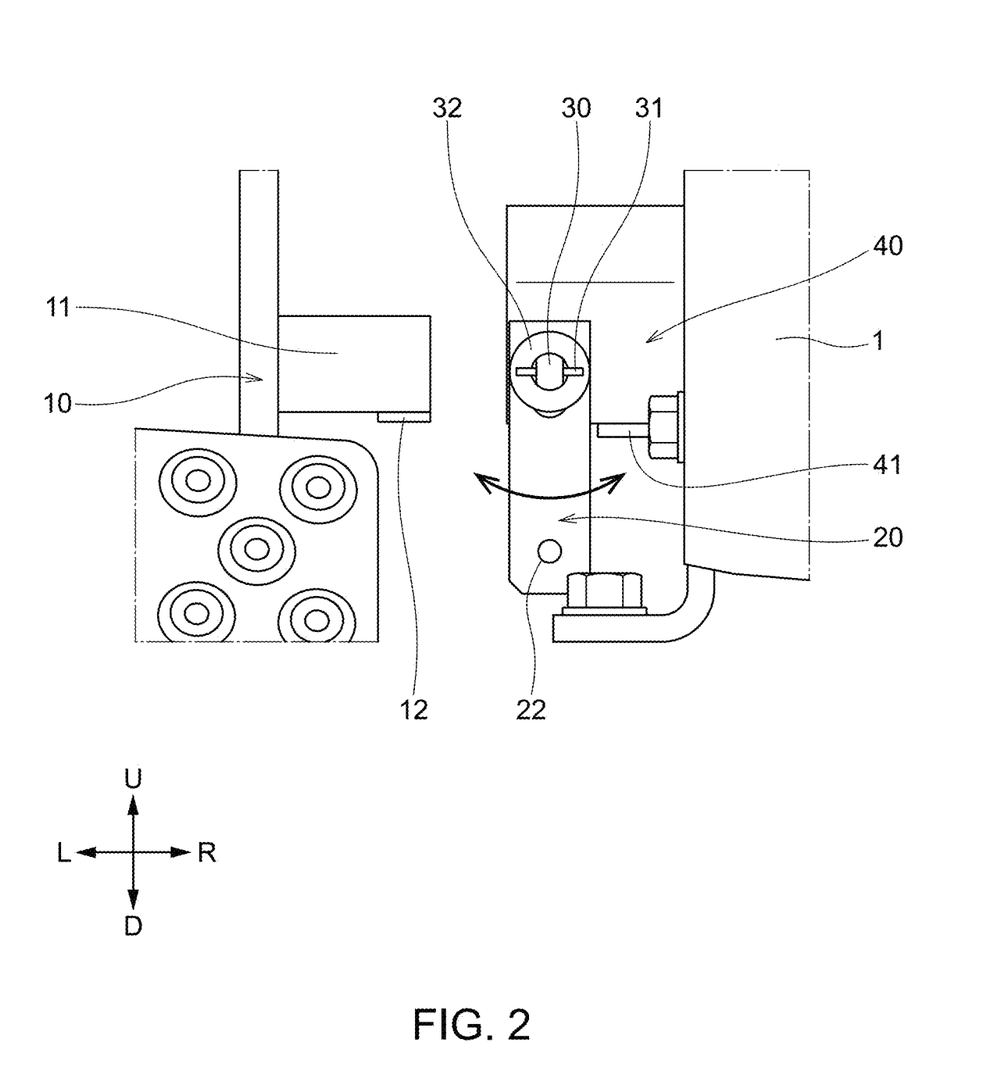
FIG. 2 is a diagram to illustrate an example of the clutch pedal locking device 100 according to a preferred embodiment of the present invention.
Figure 3A:
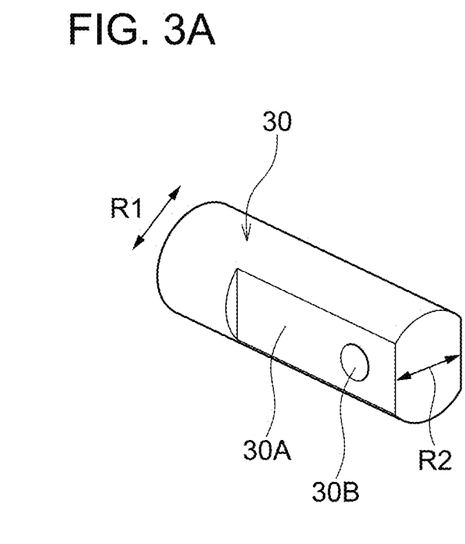
FIGS. 3A and 3B are diagrams to illustrate an example of a rotation plate 20 and a rotation shaft 30 of the clutch pedal locking device 100 according to a preferred embodiment of the present invention.
Figure 3B:
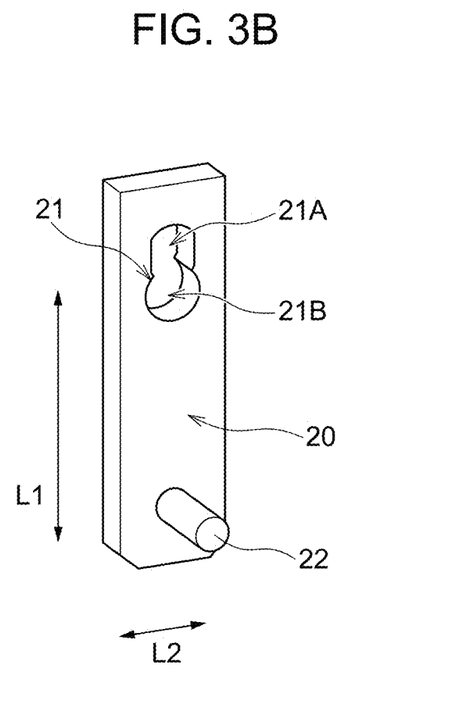

FIG. 1 is a perspective view of an example of the clutch pedal locking device 100 according to the present preferred embodiment, FIGS. 2, and 4 to 7 are diagrams to illustrate an example of the clutch pedal locking device 100 according to a preferred embodiment, and FIGS. 3A and 3B are diagrams to illustrate an example of a rotation plate 20 and a rotation shaft 30 that constitute the clutch pedal locking device 100 according to a preferred embodiment.

The clutch pedal locking device 100 according to the present preferred embodiment is provided in a work vehicle. Here, the work vehicle may be a tractor, an agricultural machine (agricultural vehicle) such as a combine harvester or a transplant machine, or a construction machine (construction vehicle) such as a loader work machine.

Preferred embodiments of the clutch pedal locking device 100 according to the present invention prevent sticking of the clutch during long-term storage by securing the work vehicle in a state where the clutch is disengaged (that is, the clutch pedal 10 is locked in a state of being stepped on).

As shown in FIGS. 1 and 2, a clutch pedal locking device 100 according to the present preferred embodiment includes a clutch pedal 10, a stay 11, a first plate 12, a first fixed portion 40, and a rotation plate 20.

Furthermore, as shown in FIGS. 1 and 2, the clutch pedal locking device 100 according to the present preferred embodiment may include a second plate 41, a spring pin 31, and a plain washer 32.

As shown in FIG. 1, the clutch pedal 10 is an operation pedal that is provided in front (F) of a left side (L) of a driver seat (not shown) and that is capable of shutting off power transmission from the engine (not shown) to the wheels (not shown).

As shown in FIG. 2, the stay 11 is attached to the clutch pedal 10 and extends rightward (R) from the clutch pedal 10.

As shown in FIG. 2, the first plate 12 is a plate attached to the lower surface of the stay 11 and that extends backward B from the stay 11.

As shown in FIGS. 1 and 2, the first fixed portion 40 is provided to a lateral side of the clutch pedal 10 and is fixed to the work vehicle body 1. Specifically, as shown in FIGS. 1 and 2, the first fixed portion 40 is provided on the right side (R) of the clutch pedal 10.

As shown in FIGS. 1 and 2, the rotation plate 20 is a plate-shaped structure suspended from and supported on the first fixed portion 40 so as to be rotatable about the rotation shaft 30. As shown in FIG. 3A, the rotation plate 20 has a longitudinal direction L1 and a width direction L2.

As shown in FIG. 3B, the rotation shaft 30 includes a columnar portion in which two flat surfaces 30A facing each other are formed on a portion of a lateral surface. As shown in FIG. 3B, a hole portion 30b penetrating between the corresponding two flat surfaces 30A is provided in the rotation shaft 30.

As shown in FIG. 3A, a through-hole 21 is provided in the rotation plate 20. Here, as shown in FIG. 3A, the through-hole 21 may include a first hole portion 21A and a second hole portion 21B.

Figure 4:
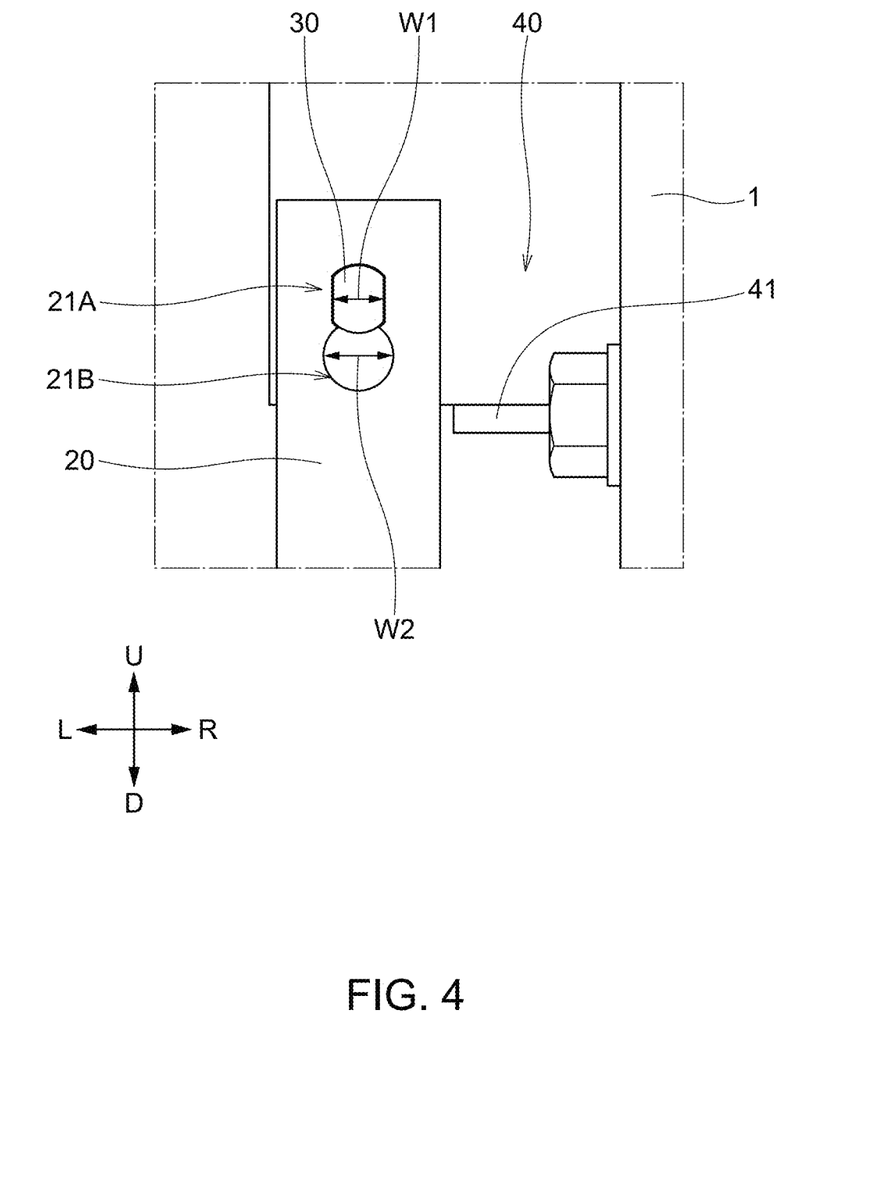
FIG. 4 is a diagram to illustrate an example of the clutch pedal locking device 100 according to a preferred embodiment of the present invention.

Specifically, as shown in FIGS. 3B and 4, the first hole portion 21A has a width W1, which is shorter than a diameter R1 of the columnar portion constituting the rotation shaft 30. Here, the width W1 of the first hole portion 21A is longer than a length R2 between two opposing flat surfaces 30A on the rotation shaft 30 (see FIG. 3B). That is, it can be said that the through-hole 21, which is keyhole-shaped, is provided in the rotation plate 20.

As shown in FIGS. 3B and 4, the second hole portion 21B is provided below the first hole portion 21A, and has a width W2 longer than the above-described diameter R1.

Here, in a state where the clutch pedal 10 is not locked, the rotation shaft 30 is located in the first hole portion 21A under the weight of the rotation plate 20, and the rotation plate 20 is not rotatable about the rotation shaft 30.

On the other hand, in a case where the rotation shaft 30 is located in the second hole portion 21B, the rotation plate 20 is capable of rotating about the rotation shaft 30 (see arrow in FIG. 2).

Note that, as shown in FIG. 3B, the rotation plate 20 may have a grip portion 22 that stands upright from a surface where the through-hole 21 is located.

As shown in FIGS. 1 and 2, the second plate 41 is attached to a lower surface of the first fixed portion 40, and extends backward (B) from the first fixed portion 40. Here, the second plate 41 may be a plate.

As shown in FIGS. 1 and 2, the plain washer 32 is provided backward (B) from the first fixed portion 40. A central hole is located in the center of the plain washer 32.

Here, as shown in FIGS. 1 and 2, the rotation plate 20 is suspended from and supported on the first fixed portion 40 by inserting the rotation shaft 30 into a central hole of the plain washer 32 and the through-hole 21 of the rotation plate 20 and by inserting the spring pin 31 into the hole portion 30b located in the rotation shaft 30.

Note that, as shown in FIG. 1, in a case where the rotation plate 20 rotates until the longitudinal direction L1 becomes substantially horizontal (see arrow B in FIG. 1) in a state where the clutch pedal 10 is stepped on (see arrow A in FIG. 1), the rotation plate comes into contact with the upper surface of the first plate 12 and the back surface of the stay 11, and the clutch pedal 10 is locked in the state of being stepped on.

Hereinafter, the operation for locking the clutch pedal 10 will be specifically described with reference to FIGS. 5 to 7.

In a state where the clutch pedal 10 is not locked, that is, in an unlocked state, the rotation plate 20 hangs downward (D) under its own weight, and the rotation shaft 30 is located in the first hole portion 21A. In this unlocked state, the rotation plate 20 is incapable of rotating about the rotation shaft 30.

Figure 5:
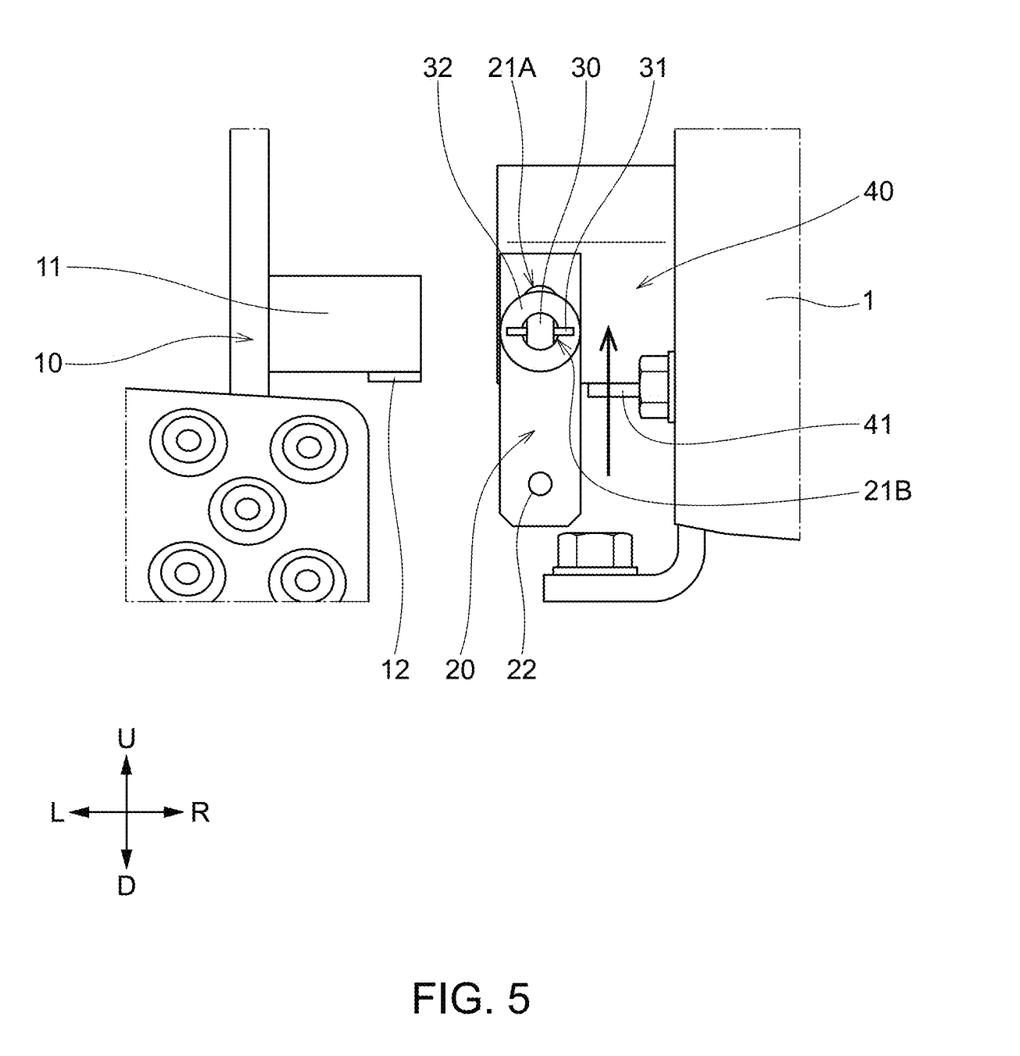
FIG. 5 is a diagram to illustrate an example of the clutch pedal locking device 100 according to a preferred embodiment of the present invention.

First, while stepping on the clutch pedal 10, the operator grips the grip portion 22 and lifts the rotation plate 20 in the upward direction (U) as shown in FIG. 5 so that the rotation shaft 30 is located in the second hole portion 21B. In this state, the rotation plate 20 is rotatable about the rotation shaft 30.

Figure 6:
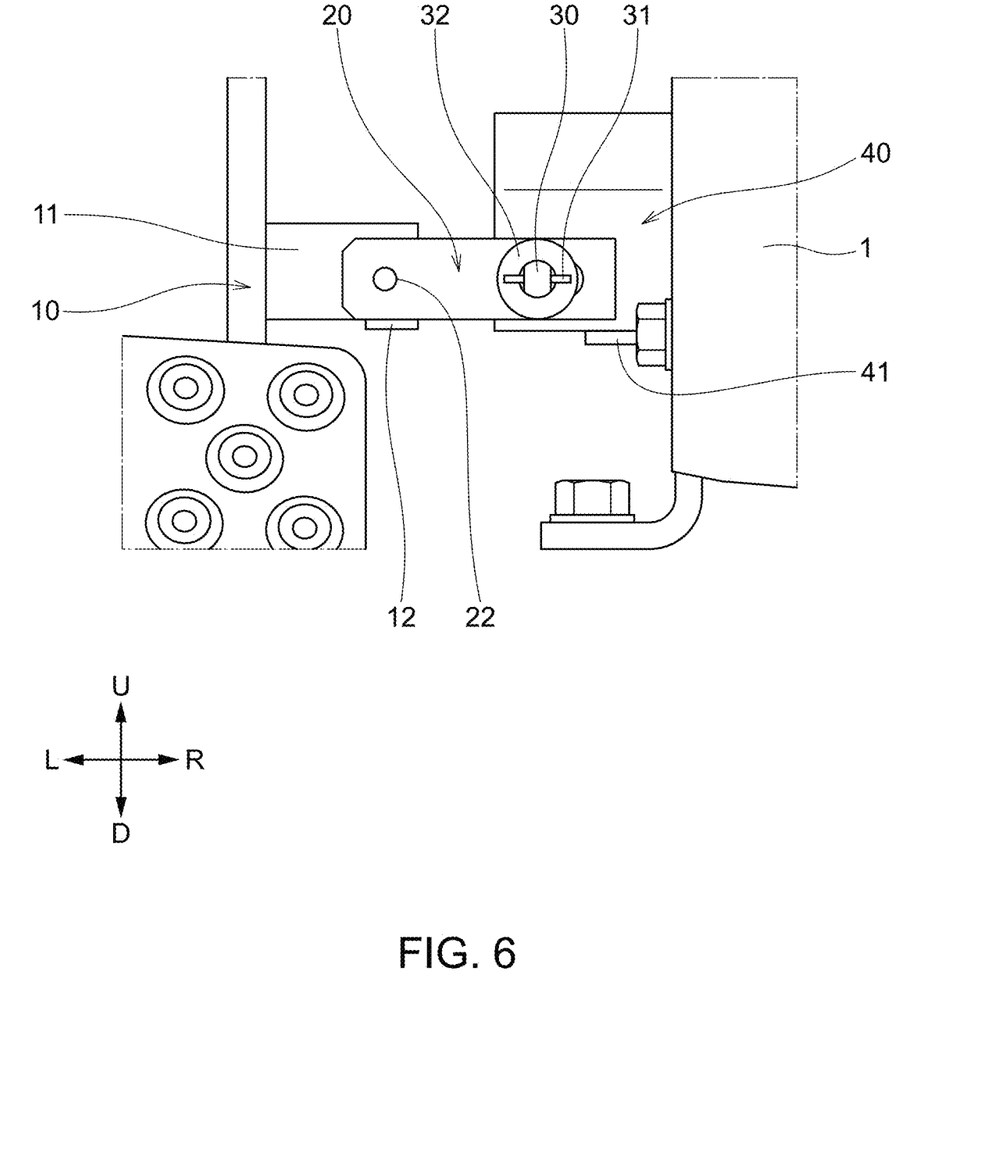
FIG. 6 is a diagram to illustrate an example of the clutch pedal locking device 100 according to a preferred embodiment of the present invention.
Figure 7:
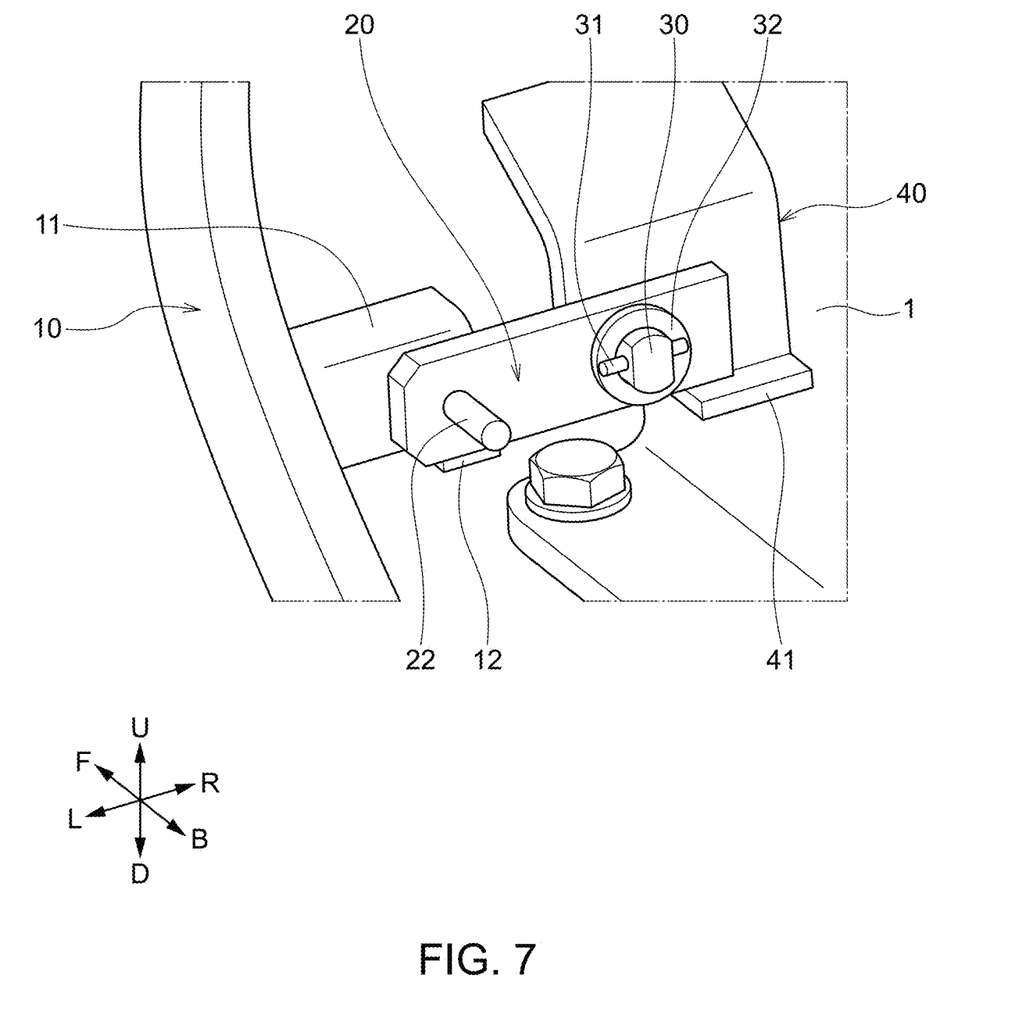
FIG. 7 is a diagram to illustrate an example of the clutch pedal locking device 100 according to a preferred embodiment of the present invention.

Secondly, in the state of FIG. 5, as shown in FIGS. 6 and 7, the operator rotates the rotation plate 20 clockwise by 90° into a sideways orientation (see arrow B in FIG. 1), that is, rotates the rotation plate until the longitudinal direction L1 becomes substantially horizontal.

Third, as shown in FIGS. 6 and 7, the operator is able to lock the clutch pedal 10 in a state of being stepped on by hooking the rotation plate 20 on the stay 11. Specifically, as shown in FIGS. 6 and 7, the operator places the rotation plate 20 on the upper surface of the first plate 12 attached to the lower surface of the stay 11, and thus the clutch pedal 10 can be locked in the state of being stepped on.

In the present preferred embodiment, the lock position of the clutch pedal 10 is set slightly before the maximum stepped-on position of the clutch pedal 10.

Therefore, when the operator further steps on the clutch pedal 10 in a state where the clutch pedal 10 is locked, the rotation plate 20 is disengaged from the stay 11 and returns to a vertical state under its own weight, and the clutch pedal 10 is unlocked. At this time, the rotation shaft 30 returns to a state of being located in the first hole portion 21A.

According to the present preferred embodiment, by putting and hooking the rotation plate 20 on the upper surface of the first plate 12 attached to the lower surface of the stay 11, the rotation plate 20 can be more reliably hooked on the clutch pedal 10, and the sliding down of the rotation plate 20 can be prevented after the clutch pedal 10 is locked in a state of being stepped on.

According to the present preferred embodiment, the operator is able to lock the clutch pedal 10 in the state of being stepped on simply by performing a simple operation using one hand.

According to the present preferred embodiment, because the through-hole 21 includes the first hole portion 21A and the second hole portion 21B, in a case where the rotation shaft 30 is located in the first hole portion 21A, the rotation plate 20 is incapable of rotating about the rotation shaft 30, and in a case where the rotation shaft 30 is located in the second hole portion 21B, the rotation plate 20 is capable of rotating about the rotation shaft 30.

In addition, according to the present preferred embodiment, in a case where the rotation shaft 30 is located in the first hole portion 21A, the rotation plate 20 does not rotate about the rotation shaft 30, and hence it is possible to avoid a situation where the clutch pedal 10 is erroneously locked during normal driving of the work vehicle.

According to the present preferred embodiment, when the rotation plate 20 is rotated clockwise by 90° or more, as shown in FIGS. 6 and 7, a portion of the rotation plate 20 comes into contact with the second plate 41, and further excessive rotation is reduced or prevented, and the rotation plate 20 stops at an angle at which same does not straddle the stay 11. As a result, the rotation plate 20 does not rotate excessively and is easily hooked on the stay 11.

According to the present preferred embodiment, in a state where the clutch pedal 10 is locked, the plain washer 32 receives, via the surface thereof, a force pressing the rotation plate 20 toward the spring pin 31 under a counterforce of the clutch pedal 10, and hence is capable of fulfilling the role of dispersing a load.

Modified Example 1

Hereinafter, with reference to FIGS. 8 and 9, an example of the clutch pedal locking device 100 according to Modified Example 1 will be described by focusing on differences from the example of the clutch pedal locking device 100 according to the above-described first preferred embodiment.

Figure 8:
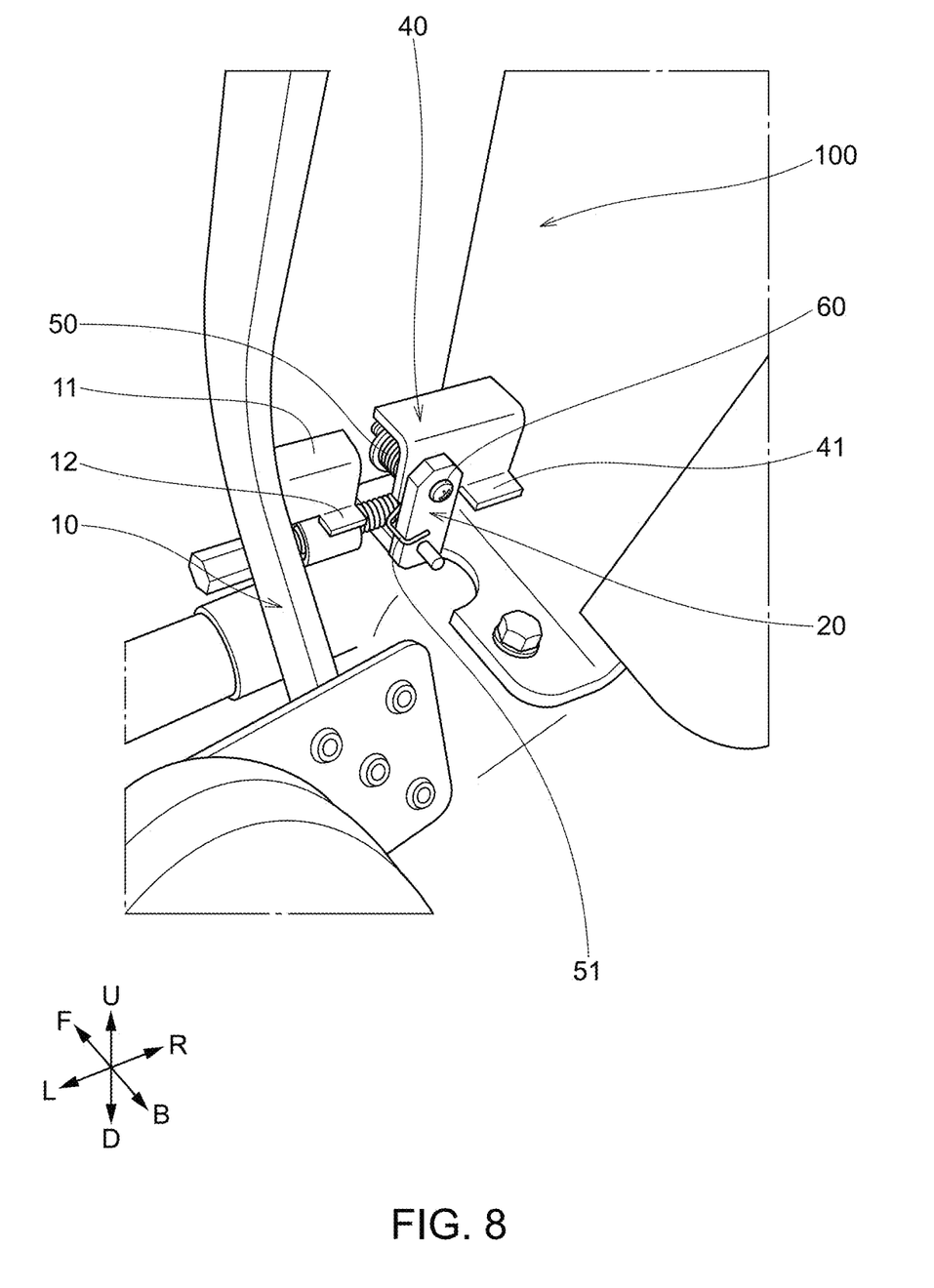
FIG. 8 is a perspective view of an example of a clutch pedal locking device 100 according to a modified example.
Figure 9:
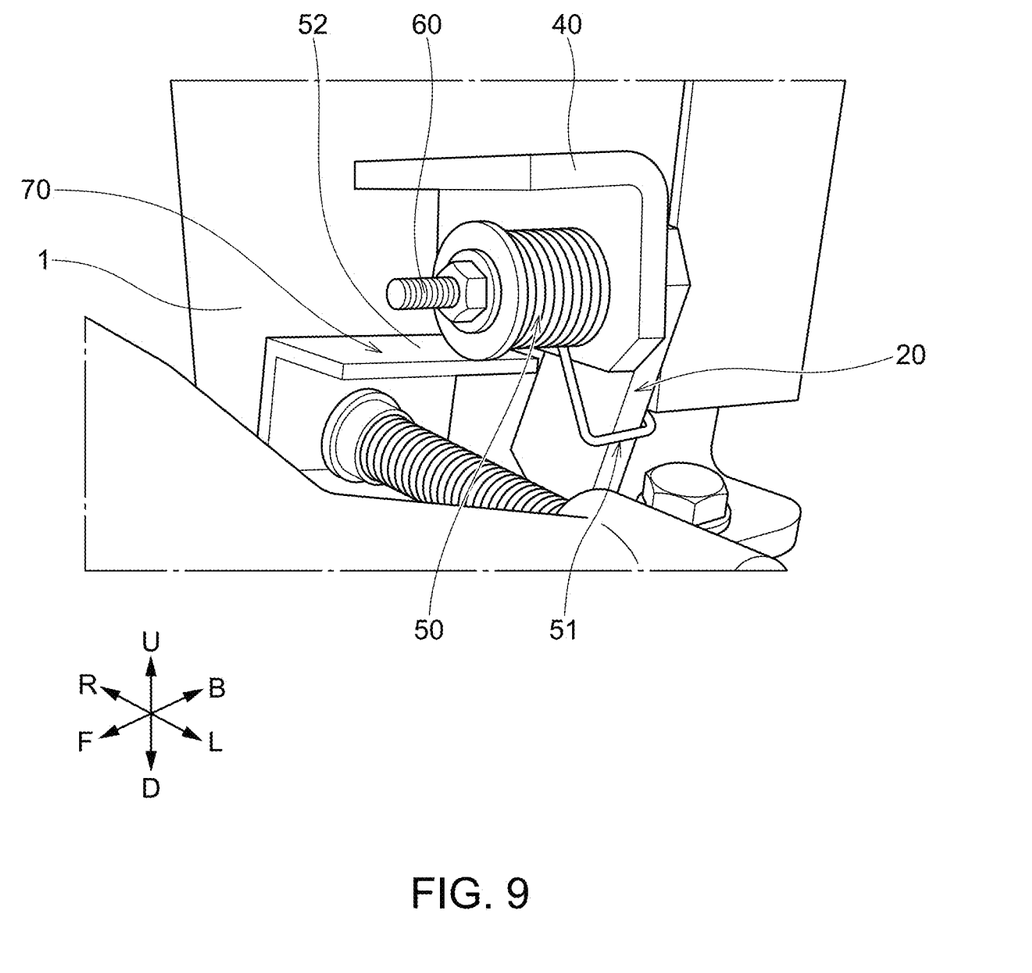
FIG. 9 is a diagram to illustrate an example of the clutch pedal locking device 100 according to a modified example.

As illustrated in FIGS. 8 and 9, the clutch pedal locking device 100 according to this Modified Example 1 includes a second fixed portion 70 and a torsion spring 50.

As illustrated in FIG. 9, the second fixed portion 70 is provided in front (F) of the first fixed portion 40 and below (D) the rotation shaft, and is fixed to the work vehicle body 1.

As illustrated in FIGS. 8 and 9, the torsion spring 50 is supported (installed and fixed) by a rotation shaft 60.

Furthermore, as illustrated in FIGS. 8 and 9, the torsion spring 50 connects the second fixed portion 70 and the rotation plate 20 with a connecting member 51 interposed therebetween.

In this Modified Example 1, the torsion spring 50 is configured to exert a restoring force that returns the rotation plate 20 to the original position in a case where the rotation plate 20 is rotated clockwise.

Note that a predetermined spring load is applied to the torsion spring 50 in order to prevent the rotation plate 20 from swinging left and right in a state where the clutch pedal 10 is not locked.

According to this Modified Example 1, because the rotation plate 20 is configured not to swing left and right during normal driving of the work vehicle, it is possible to avoid a situation in which the clutch pedal 10 is erroneously locked.

According to this Modified Example, when the rotation plate 20 rotates clockwise and is rotated until the longitudinal direction L1 becomes substantially horizontal, same comes into contact with the upper surface of the first plate 12 and the back surface of the stay 11 under the restoring force of the torsion spring 50, and the clutch pedal 10 can be locked in a state of being stepped on.

According to a preferred embodiment of the present invention, because a structure to lock the clutch pedal 10 is provided in the right direction (R) of the clutch pedal 10, preferred embodiments of the present invention can also be applied to work vehicles in which a component to attach a clutch pedal locking device does not exist on the engine room side.

According to preferred embodiments of the present invention, it is possible to realize clutch pedal locking devices 100 each with a simple structure in which the number of parts is as small as possible, and at low cost.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A clutch pedal locking device comprising:
   a clutch pedal;
   a stay attached to the clutch pedal;
   a first plate attached to a lower surface of the stay and that extends backward from the stay;
   a first fixed portion provided to a lateral side of the clutch pedal and fixed to a work vehicle body; and
   a rotation plate suspended from and supported on the first fixed portion so as to be rotatable about a rotation shaft; wherein
   in a case where the rotation plate rotates until a longitudinal direction becomes substantially horizontal, the rotation plate comes into contact with an upper surface of the first plate and a back surface of the stay, and the clutch pedal is locked in a state of being stepped on.

2. The clutch pedal locking device according to claim 1, wherein
   a through-hole is located in the rotation plate;
   the rotation shaft includes a columnar portion in which two opposing flat surfaces are provided on a portion of a lateral surface;
   the through-hole includes a first hole portion with a width shorter than a diameter of the columnar portion and a second hole portion provided below the first hole portion and having a width longer than the diameter; and
   in a state where the clutch pedal is not locked, the rotation shaft is located in the first hole portion, and the rotation plate is not rotatable about the rotation shaft.

3. The clutch pedal locking device according to claim 1, further comprising a second plate attached to a lower surface of the first fixed portion and extending backward from the first fixed portion.

4. The clutch pedal locking device according to claim 1, further comprising:
   a plain washer provided backward from the first fixed portion; and
   a spring pin; wherein
   the rotation plate is suspended from and supported on the first fixed portion due to the rotation shaft being inserted into a central hole and the through-hole of the plain washer and due to the spring pin being inserted into a hole portion in the rotation shaft.

5. The clutch pedal locking device according to claim 1, further comprising:
   a second fixed portion provided in front of the first fixed portion and below the rotation shaft, the second fixed portion being fixed to the work vehicle body; and
   a torsion spring supported by the rotation shaft and that connects the second fixed portion and the rotation plate.

* * * * *